June 2, 1931. C. P. HEGAN 1,807,984
AIR FILTER
Filed Sept. 15, 1924  2 Sheets-Sheet 1
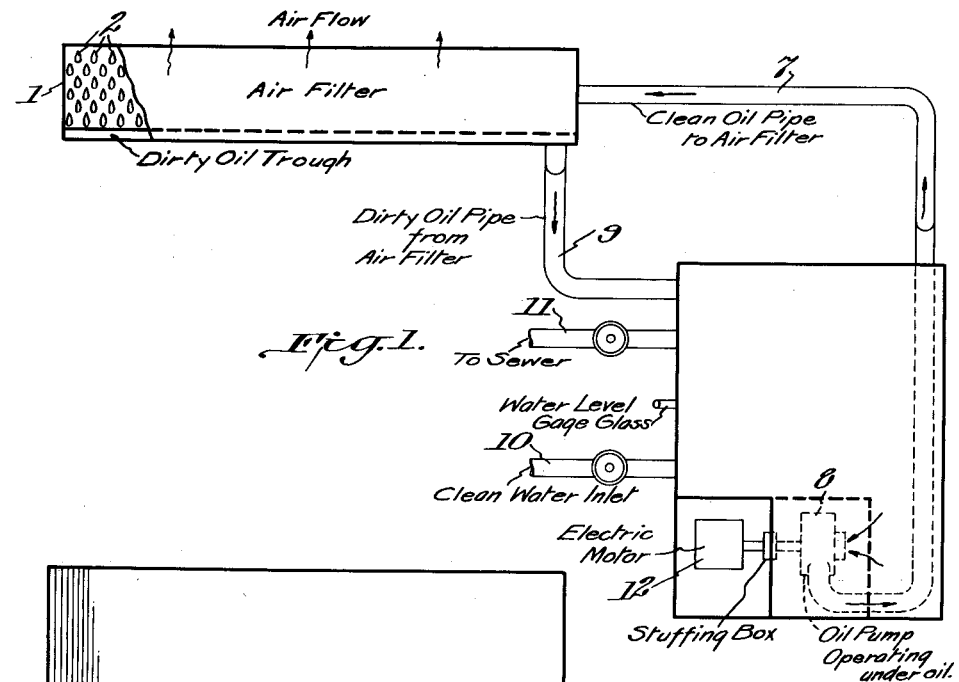
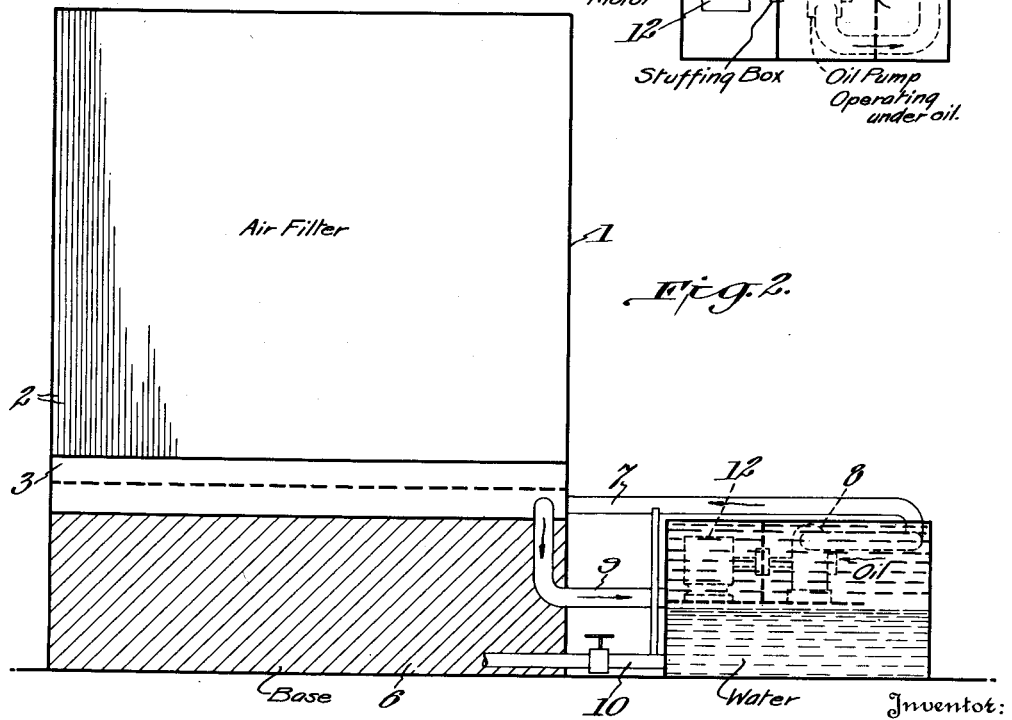

June 2, 1931.  C. P. HEGAN  1,807,984
AIR FILTER
Filed Sept. 15, 1924   2 Sheets-Sheet 2
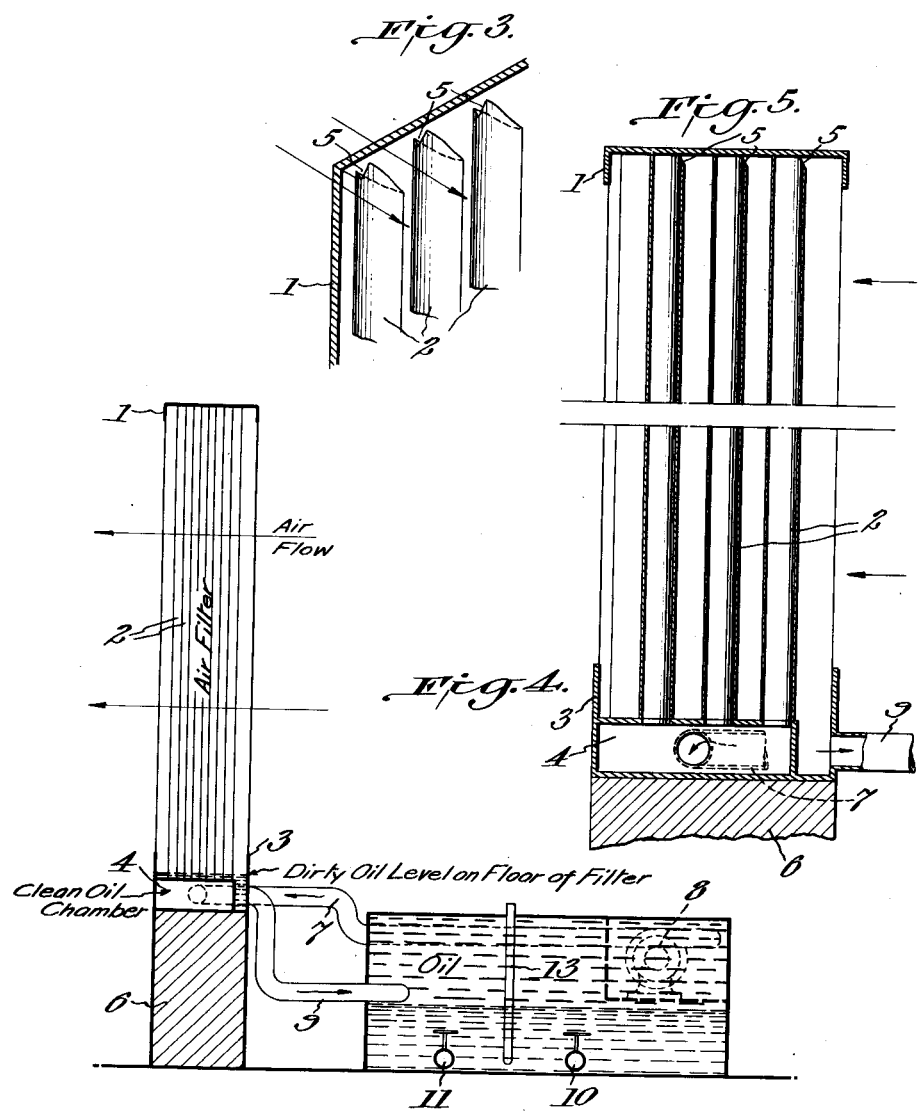

Patented June 2, 1931

1,807,984

UNITED STATES PATENT OFFICE

CHESTER P. HEGAN, OF LOUISVILLE, KENTUCKY, ASSIGNOR, BY MESNE ASSIGNMENTS, TO AMERICAN AIR FILTER COMPANY, INC., OF LOUISVILLE, KENTUCKY, A CORPORATION OF DELAWARE

AIR FILTER

Application filed September 15, 1924. Serial No. 737,942.

The invention relates to air filters and particularly to filters of the so-called deflector type in which the air is freed from impurities by repeated contacts with elements against which the air impinges.

Filters of this general type are well known in the art and are frequently described as "deflectors", since the repeated contacts of the air are secured by changes in direction or deflections of the air stream. In the prior constructions, the deflector elements were frequently coated with a viscous or sticky composition which held the separated impurities to the deflectors. While this adhesive coating increased the efficiency of the filter, it increased the difficulties of cleaning the filter as it was no longer possible to displace the collected impurities by jarring the deflector elements. The removal of material deposited on the coated deflectors required a washing or scrubbing operation and in some constructions it was necessary to dismantle the filter for cleaning operations. It has been proposed to construct the deflector elements as endless movable bands or screens which travel through an oil bath in which the collected material is removed. This solution of the problem of cleaning a filter having coated deflector elements is open to the objections that the elements are subjected to wear and considerable power is required to operate a large capacity filter.

An object of this invention is to provide a self-cleaning deflector type filter in which the deflector elements are stationary. An object is to provide a filter having stationary deflector elements upon which the supply of viscous coating liquid is continuously renewed. A further object is to provide a filter having stationary deflector elements from which the liquid and impurities held therein is continuously removed by a supply of fresh liquid. More specifically an object is to provide a filter of the type stated, in which the contaminated coating liquid is removed from the filter, the impurities separated therefrom and the cleaned liquid again supplied to the filter.

These and other objects of the invention will be apparent from the following specification when considered in connection with the accompanying drawings in which:

Fig. 1 is a plan view, partly in section, of a filter embodying my invention;

Fig. 2 is a front elevation of the filter, the oil purifier being shown in section;

Fig. 3 is a fragmentary perspective view of the tops of the deflector elements;

Fig. 4 is a vertical section through the filter; and

Fig. 5 is a fragmentary vertical section, similar to Fig. 4, but on a larger scale, and showing the detailed construction of the hollow deflector elements.

In the drawings, the numeral 1 indicates an open frame within which the deflector elements 2 are arranged. The base of the frame 1 is formed as a channel 3 within which a conduit 4 is located. The deflector elements 2 are preferably hollow and communicate with the conduit 4 upon which they are mounted. As will be explained later, a viscous liquid, such as oil, is forced into the conduit 4 and overflows the hollow deflector elements to form a moving viscous film upon the same. As here shown, the entire supply of oil for each tube overflows through a notch 5 at the top of the element 2. While it is not essential, the elements 5 are preferably of substantially stream line cross-section and are arranged with their blunt or forward side presented to the incoming air stream. By employing elements of this shape, the resistance to air flow is a minimum and also the oil which overflows at the forward face of the element is readily distributed over the entire outer surface of the element by the moving air stream.

The conduit 4, or clean oil chamber is located in the channel 3, but is smaller than said channel to provide a trough in which the mixed oil and collected impurities may drain from the elements. The dirty oil passes from the collecting trough to a separator, preferably by gravity, and the filter is therefore mounted upon a base 6. The separator comprises a closed tank of relatively large capacity through which the oil moves at a low velocity. As shown in the drawings, the tank is provided with a pipe 7 through which clean oil is passed, by a pump 8, to the conduit 4 and a pipe 9 through which dirty oil returns to the tank. The tank is also provided with inlet and outlet water pipes 10, 11 respectively for maintaining a layer of water at the bottom of the tank. Dirt and impurities will settle out of the oil into the water and can be flushed into the sewer through pipe 11. The oil pump 8 may be driven by any convenient power means, for example an electric motor 12, and the pump is preferably submerged in the oil which fills the upper portion of the separator tank. A gage glass 13 is provided for indicating the level of the water in the separator.

In operation the clean oil is pumped through the conduit 4 to the several elements from which it overflows to provide a viscous film in which the impurities are held, which film is gradually displaced downwardly to carry the collected impurities into the channel 3. From the channel 3 the dirty oil flows to the separator, and after purification, it is returned to the filter.

It will be noted that the mechanical parts of the filter are stationary and that the filter is self-cleaning due to the continuously moving viscous film which collects the impurities from the air and then removes them from the deflector elements.

It will be apparent that the invention is not limited to the embodiment described herein as many changes in the several parts, their relative size, shape and location may be made without departing from the spirit of the invention as set forth in the following claims.

I claim:

1. In a filter the combination of a hollow upright deflector, means for forcing liquid upwardly through said deflector, and a liquid overflow outlet positioned to restrict the distribution of discharged liquid over a predetermined portion of the outer surface of the deflector.

2. In a filter the combination of a hollow upright deflector having an overflow guiding notch in its upper end, and means for forcing liquid upwardly through said deflector to overflow through said notch for distribution over a portion of said deflector disposed below said notch.

In testimony whereof, I affix my signature.

CHESTER P. HEGAN.